United States Patent [19]

Yu

[11] Patent Number: 4,852,986

[45] Date of Patent: Aug. 1, 1989

[54] AUTOMOBILE REAR-VIEW MIRROR

[76] Inventor: Zhou Yu, 1139 Maple, Evanston, Ill. 60202

[21] Appl. No.: 194,871

[22] Filed: May 17, 1988

[51] Int. Cl.$^4$ .......................... G02B 7/18; G02B 5/08; G02B 5/10; B60R 1/08

[52] U.S. Cl. ................................. 350/603; 350/606; 350/615; 350/626; 350/629; 248/476

[58] Field of Search ............... 350/615, 282, 603, 606, 350/616, 626, 627, 632, 629; 248/231.4, 231.8, 476, 481

[56] References Cited

U.S. PATENT DOCUMENTS

| | | | |
|---|---|---|---|
| 2,210,147 | 8/1940 | Griffith | 350/626 |
| 3,048,084 | 8/1962 | Iannuzzi | 350/626 |
| 4,614,412 | 9/1986 | Cohen | 350/632 |
| 4,793,701 | 12/1988 | Brown | 350/632 |

FOREIGN PATENT DOCUMENTS

| | | | |
|---|---|---|---|
| 2747936 | 5/1978 | Fed. Rep. of Germany | 350/627 |
| 1390939 | 1/1965 | France | 248/476 |
| 2126548 | 3/1984 | United Kingdom | 350/616 |

*Primary Examiner*—Bruce Y. Arnold
*Assistant Examiner*—R. D. Shafer

[57] ABSTRACT

This invention introduces an automobile rear-view mirror assembly which is mounted on traditional center and driver-side rear-view mirrors.

The mirror's angle of coverage and position with respect to the traditional flat rear-view mirrors can be very easily adjusted to fit different cars, drivers, and seat positions.

The flat part of this mirror guarantees real distance feeling, and the curved part of of this mirror extends the angle of coverage without increasing the mirror's size.

8 Claims, 2 Drawing Sheets

AUTOMOBILE REAR-VIEW MIRROR

DESCRIPTION OF PRIOR ART

This invention relates to an automobile rear-view mirror.

Most center rear-view and driver-side rear-view mirrors for an automobiles are flat, leaving block angle problems. To solve the block angle problem, some inventors invented wide angle mirrors and obtained patents on their inventions. U.S. Pat. No. 4,031,772 of DeCastri, No. 3,972,601 of Johnson, No. D244,271 of Harrison, No. D239,932 of Kim, No. D246,099 of Hassinger, No. D152,347 of Marty, No. D199,120 of Beach, and No. D214,436 of Torres are some good examples of those inventions.

Some manufacturers introduced small size mirrors, with round curvature, to stick on driver-side flat rear-view mirrors. Also introduced by some manufacturers are big size rectangularly shaped mirrors, with roughly round curvature, to mount on and entirely cover center flat rear-view mirrors.

There are, however, some insolvable problems in the prior art of rear-view mirrors.

Each of the above-mentioned mirrors offers a certain range of angle coverage. The requirement for a mirror's position and a mirror's angle coverage varies from driver to driver, from seat positon to seat position, and from car to car. After any of the above-mentioned mirrors are installed, neither a mirror's angle coverage nor a mirror's position with respect to the original flat mirror can be easily adjusted to fit different seat positions and drivers.

Round, small-size mirrors which are stuck on flat, driver-side rear-view mirrors block part of the view of the flat mirrors.

Rectangularly-shaped big mirrors having roughly round curvatures entirely block the view of center flat rear-view mirrors, and cause objects to look smaller in the mirrors, and the distance illusion may induce collision.

SUMMARY OF THE INVENTION

Mirrors of this invention fall into two categories: Mirrors placed on the right side of or on the left side of flat conventional center rear-view mirrors, where the objects in the right side or the left side block an angle, of view and mirrors placed either on the left side of or on the top of driver-side rear-view mirrors where the objects in the left side block an angle of view. The mirrors of this invention surpass the prior art in the following:

Both angle coverage and position of this mirror with respect to the original flat rear-view mirror can be very easily adjusted to fit different cars, drivers, and seat positions.

A lot of drivers are used to traditional flat rear-view mirrors and are reluctant to substitute for their comfortable traditional mirrors the mirrors of the above mentioned prior art. Mirrors of this invention function as a supplement to the traditional mirror rather than a substitute. Drivers don't lose any angle coverage or any benifits of their traditional mirrors. They may keep using their traditional, flat, rear-view mirrors to view objects right behind them and use the mirrors of this invention to view objects in the blocked angles. Therefore this rear-view mirror will be accepted by drivers at a much faster rate, and thus this mirror may save more lives.

The flat part of this mirror guarantees real distance feeling, and the curved part of of this mirror extends the angle of coverage without increasing the mirror's size.

DETAILED DESCRIPTION OF THE PREFERRED EMBODIMENT

Figure 1:
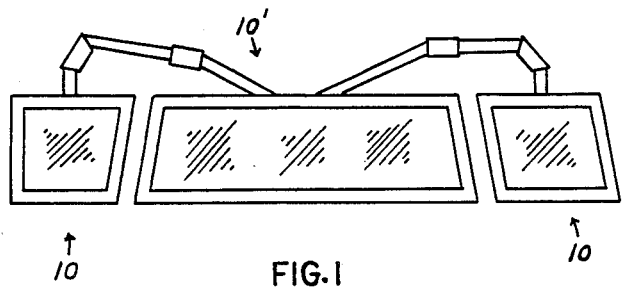
FIG. 1 shows the side elevational view of a flat conventional rear-view mirror with a two-plate rear-view mirror of this invention on each side of the conventional mirror.

FIG. 1 shows a conventional center rear-view mirror 10' with a two-plate rear-view mirror 10 on the right and left side of it.

Figure 2:
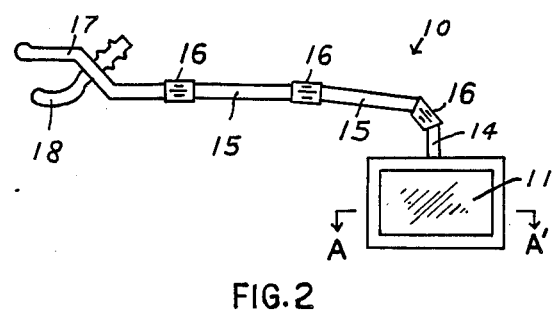
FIG. 2 shows the side elevational view of one embodiment of this invention, which is a two-plate rear-view mirror.
Figure 3:
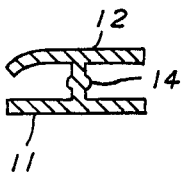
FIG. 3 shows the cross-sectional view taken along line A—A' of FIG. 2.

FIG. 2 shows the details of FIG. 1's mirror 10. Elastic clip bar 17 has a hole to let an elastic clip arm 18 pass. Clip arm 18 has some sawtooth grooves so that clip bar 17 and clip arm 18 may clip on bars of different cross-sections. The bar being clipped-on is the bar supporting the conventional center rear-view mirror. All direction connectors 16 connect clip bar 17, to supporting bars 15, and the mirror bar 14. Underneath mirror bar 14 there is a mirror plate 11 and a mirror plate 12 which is behind plate 11 and can not be seen in FIG. 2. FIG. 3 shows the cross-sectional view taken along line A—A' of FIG. 2. Plate 11, plate 12, and bar 14 are made into one rigid integral piece. Both plate 11 and plate 12 have flat parts and curved tails. The flat part guarantees real distance feeling and the curved tail of roughly round curvature extends the mirror's angle coverage without increasing the mirror's size. Plate 11's tail curvature is different from plate 12's tail curvature. Connector 16 which connects bar 14 and bar 15 allows plate 11, plate 12, and mirror bar 14 to rotate along the axis of mirror bar 14. Therefore by rotating and moving mirror plate 11 and mirror plate, the driver may easily change the angle coverage and adjust the mirror's position with respect to conventional center rear-view mirrors to achieve a better desired effect.

Figure 4:
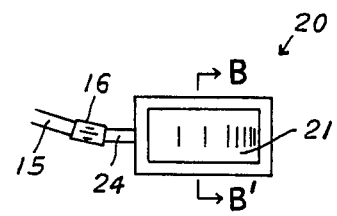
FIG. 4 shows the side elevational view of another embodiment of this invention, which is a three-plate rear-view mirror.
Figure 5:
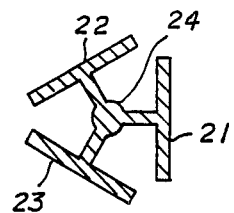
FIG. 5 shows the cross-sectional view taken along line B—B' of FIG. 4.

FIG. 4 shows the mirror part of a three plate mirror 20. FIG. 5 shows the cross-sectional view taken along line B—B' of FIG. 4. Mirror plate 21, mirror plate 22, and mirror plate 23 have flat parts and curved tails with different curvatures to get different angle coverage. By rotating the three plate mirror set along the axis of mirror bar 24, drivers may select which plate is best to face the rear direction.

Figure 6:
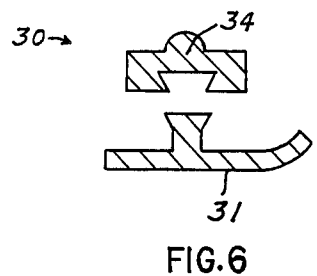
FIG. 6 shows the horizontal cross-section of the mirror part of still another embodiment, a plate-dismountable mirror.

FIG. 6 shows the horizontal cross-section of a plate-dismountable mirror 30. At the bottom of mirror bar 34, there is a trough feature to allow a dismountable mirror plate 31 to slide in. Each rear-view mirror set of this embodiment has at least two dismountable mirror plates 31. The size and the tail curvature of one plate is different from that of another plate. One driver may select one plate to plug in and keep the rest of the plates in the glove compartment for other drivers to choose from.

Figure 7:
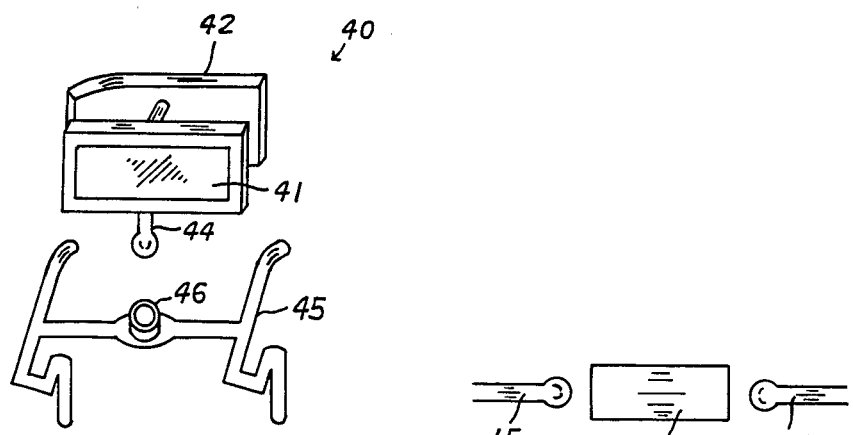
FIG. 7 shows the perspective view of still another embodiment, a two plate rear-view mirror to be mounted either on the top of or on the left side of driver-side rear-view mirror.

FIG. 7 shows the perspective view of a two-plate rear-view mirror 40, which is composed of mirror plate 41, mirror plate 42, mirror bar 44, and elastic clip frame 45. Frame 45 has an all-direction connector 46 to accommodate the lower end of mirror bar 44. Frame 45 may be clipped on top of a driver-side rear-view mirror. After increasing the height of the mirror plates, decreasing the width of the mirror plates, and rotating the mirror bar ninety degrees, frame 45 may be clipped on the left side of a driver-side rear-view mirror. Clip frame 45 may be replaced by a sticky pad.

Mirror set of FIG. 7 may be replaced by two other mirror sets which are similar to the mirror sets of FIG. 4 and FIG. 6.

Each mirror set may contain one flat mirror plate which has no tail part.

Figure 8:
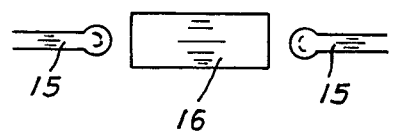
FIG. 8 shows an enlarged view of a connector and part of two supporting bars.

FIG. 8 shows an all-direction connector 16 and part of two supporting bars 15. Bar 15 has semi-ball end. Connector 16 has a hollow spherical cavity to accommodate the semi-ball end. Connector 16 may be made of rubber, soft plastic, or some other material.

I claim:

1. An automobile rear-view mirror which is mounted to a side of a conventional, automobile center, rear-view mirror, comprising a clip means, a flexible supporting means, and a mirror set, said clip means being clipped on a bar connecting said conventional, automobile, center, rear-view mirror to the interior of said automobile, said flexible supporting means connecting said clip means to said mirror set to allow said mirror set to be moved and rotated arbitrarily, said mirror set having two mirror plates facing opposite directions, at least one of said two mirror plates having a flat major part with a convex, curved tail.

2. An automobile rear-view mirror according to claim 1, wherein said mirror set has three mirror plates forming a triangular arrangement, at least two of said three mirror plates having flat major parts with convex, curved tails.

3. An automobile rear-view mirror according to claim 1, wherein said mirror set comprises at least two dismountable mirror plates, at least all mirror plates but one having flat major parts with convex, curved tails.

4. An automobile rear-view mirror which is mounted to a side of a conventional, automobile, driver-side, rear-view mirror, comprising a clip frame, a flexible supporting means, and a mirror set, said clip frame being clipped on said convention, automobile, driver-side, rear-view mirror and having a connector attaching said mirror set to said flexible supporting means, said mirror set having two mirror plates facing opposite directions, at least one of said two mirror plates having a flat major part with a convex, curved tail.

5. An automobile rear-view mirror according to claim 4, wherein said mirror set has three mirror plates forming a triangular arrangement, at least two of said three mirror plates having flat major parts with convex, curved tails.

6. An automobile rear-view mirror according to claim 4, wherein said mirror set comprises at least two dismountable mirror plates, at least all mirror plates but one having flat major parts with convex, curved tails.

7. An automobile rear-view mirror according to claim 1, one mirror plate of said mirror set is a flat, non-dismountable, mirror plate.

8. An automobile rear-view mirror according to claim 1, wherein one mirror plate of said mirror set is a non-dismountable mirror plate having a flat major part with a convex, curved tail.

* * * * *